June 7, 1955 G. H. JONES 2,709,928
VARIABLE SPEED TRANSMISSION
Filed Jan. 31, 1951 4 Sheets-Sheet 1

INVENTOR.
Gordon H. Jones
BY
Carlson, Pitzner, Hubbard & Wolfe
Attys.

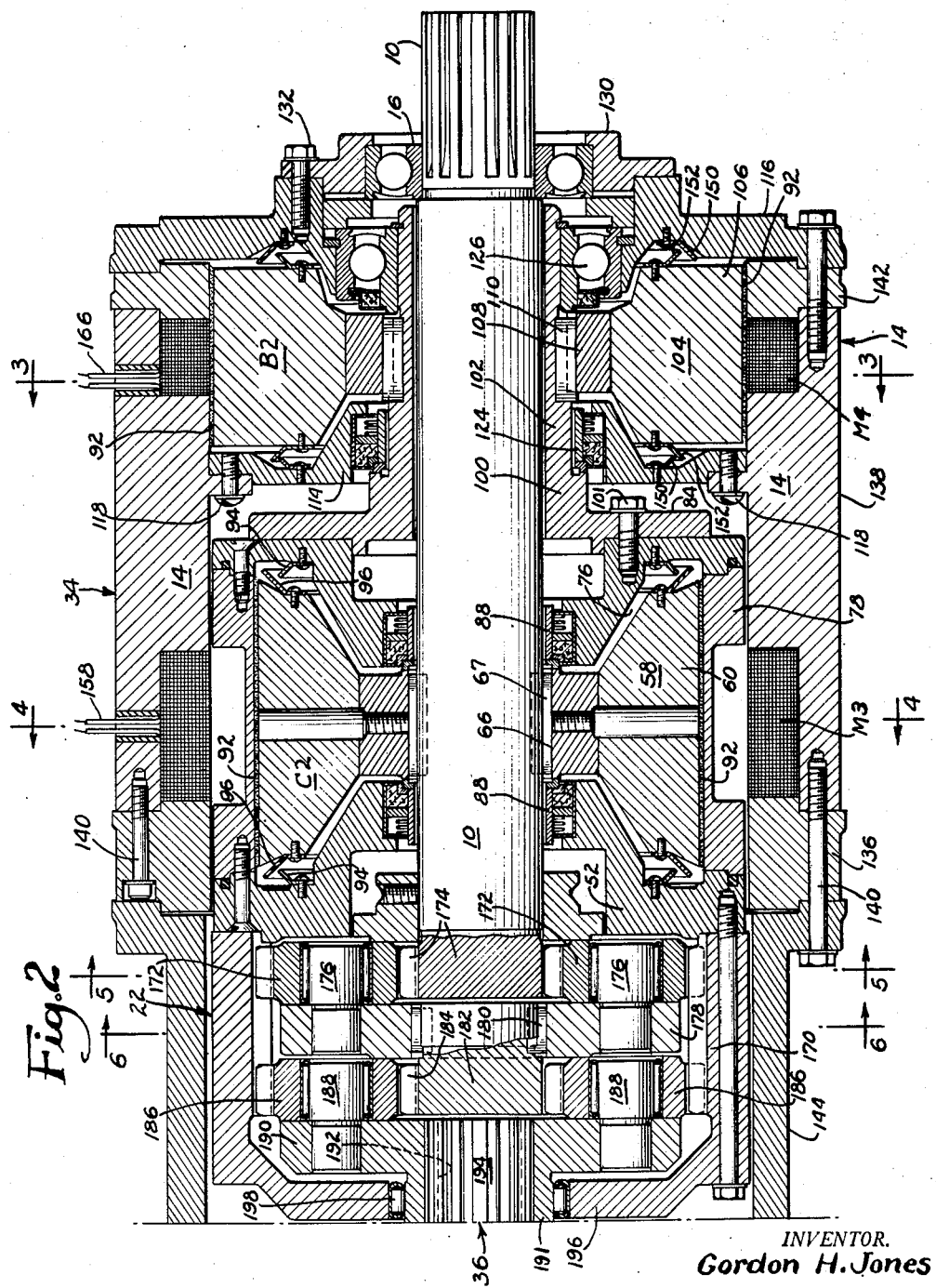

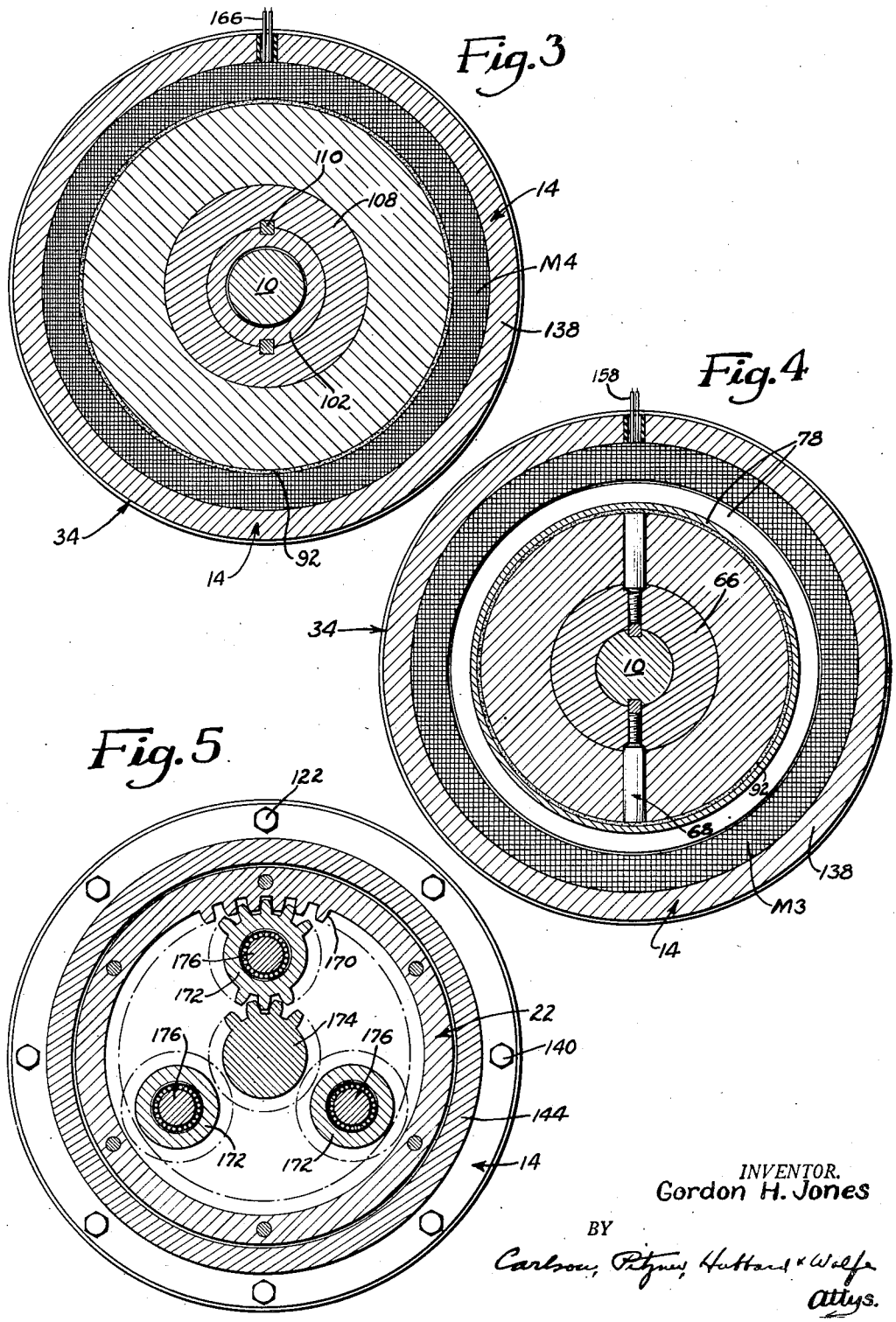

INVENTOR.
Gordon H. Jones

United States Patent Office 2,709,928
Patented June 7, 1955

2,709,928

VARIABLE SPEED TRANSMISSION

Gordon H. Jones, Fond du Lac, Wis., assignor to Giddings & Lewis Machine Tool Company, Fond du Lac, Wis., a corporation of Wisconsin Application January 31, 1951, Serial No. 208,678

5 Claims. (Cl. 74—769)

The present invention relates to speed change transmissions and more particularly to transmissions of the constant mesh planetary gearing type wherein various combinations of constant mesh gears are selectively rendered operative to produce various forward speed ratio drives through the transmission. By "forward speed ratio drive" is meant a drive through the transmission from the driving or input shaft to the driven or output shaft wherein the latter shaft is rotated in the same direction as the former shaft, as distinguished from reverse speed ratio drive wherein the output shaft is driven in a direction opposite to the direction of rotation of the input shaft.

The improved variable speed transmission comprising the present invention is primarily for use in connection with horizontal boring, drilling and milling machines for feed drive purposes in an arrangement where two feed units, each embodying the present transmission, are employed for translating the three main operating units of the machine, either individually or in combinations of two, and independently in either direction and at varying speed rates. When put to such use, it is contemplated that one transmission shall serve the table and the headstock while the other transmission shall serve the saddle and the table so that each machine unit may operate with complete independence of movement as to direction and rate, either independently or jointly with any one of the other two machine units to obtain all of the motions required for the various cutting operations to be performed by the machine.

The improved transmission is, however, capable of other uses and the same may, with or without modification, be employed in a wide variety of applications, either for machine tool drive purposes or otherwise.

It is among the principal objects of the present invention to provide a transmission of the type indicated above which is capable of at least four changes of speed in a forward direction.

Another object of the invention is to provide a transmission of the planetary gearing type having two planetary gearing sets which are arranged in series in such a manner that the gearing of one set may be selectively compounded with the gearing of the other set to produce the various speed ratio drives of which the transmission is capable.

A further object of the invention is to provide a transmission of this character having a driving shaft, an intermediate shaft, and a driven shaft arranged in axial alinement, together with a first planetary gear set by means of which the driving shaft may be connected to the intermediate shaft to selectively establish a plurality of gear ratio drives between these two shafts, and with a second planetary gear set by means of which the intermediate shaft may be connected to the driven shaft to selectively establish a plurality of gear ratio drives between these two latter shafts, and together with selectively operable coupling means for the elements of each planetary gear set whereby the different gear ratio drives may be established and compounded to selectively produce a plurality of gear ratio drives through the transmission from the driving shaft to the driven shaft.

Another object of the invention is to provide a transmission of the compound planetary gearing type as set forth above including a driving shaft and a driven shaft, together with means whereby selective coupling of the various elements of the gearing may serve, not only to establish different gear ratio drives through the transmission, but also to cause the transmission as a whole to function as a clutch or as a brake, or to function simultaneously both as a clutch and a brake. By such an arrangement, the transmission will be found useful in connection with feed drive mechanisms of the type outlined above and when put to such a use the driving or the driven shaft may be braked, each independently of the other, or they may be braked simultaneously.

Another object of the invention is to provide a transmission of the character set forth above which is so desgined that the torque rating of the various clutch devices employed may be relatively low as compared to the output torque of the transmission.

Another object of the invention is to provide a transmission of the character set forth above in which the coupling means for the elements of the planetary gear sets are of the magnetic particle type and in which the various parts of the transmission assembly, including the stationary casing therefor, are so constructed and positioned that the magnetic flux which is employed to initiate the coupling operation is concentrated in the air gap provided for it between the parts to be coupled in order to render the coupling operation substantially instantaneous and also extremely efficient in its operation.

A still further object of the invention is to provide a transmission having associated therewith a planetary gear set capable of selectively establishing various speed ratio drives through the transmission from the input shaft of the transmission to the output shaft thereof and including a magnetic particle type coupling device for coupling certain elements of the planetary gear set together to vary the gear ratio drive through the transmission, together with means whereby the rotating parts of the planetary gear set are held in their rotating or orbital paths of movement within very close tolerances in order that the air gap associated with the coupling device may be made very small so as to enhance the flow of magnetic flux through the air gap for coupling purposes.

Another object of the invention is to provide a transmission including a planetary gear set having a sun gear and a plurality of planet gears meshing therewith and in which the planet gears constitute the sole supporting means for the sun gear so that the torque applied to the planet gears from the sun gear is evenly distributed to the various planet gears.

The provision of a transmission of the character briefly outlined above which is rugged and durable and which is possessed of a minimum number of rotating parts and which is consequently unlikely to get out of order is another object of the invention that has been borne in mind in the production and development of the present invention.

In the accompanying four sheets of drawings forming a part of the specification, one embodiment of the invention has been shown.

In these drawings:

Figures 1 and 2, placed side by side, constitute a sectional view taken longitudinally and substantially centrally through a transmission constructed in accordance with the principles of the present invention.

Fig. 3 is a sectional view taken substantially along the line 3—3 of Fig. 2.

Fig. 4 is a sectional view taken substantially along the line 4—4 of Fig. 2.

Fig. 5 is a sectional view taken substantially along the line 5—5 of Fig. 2.

Figure 1:
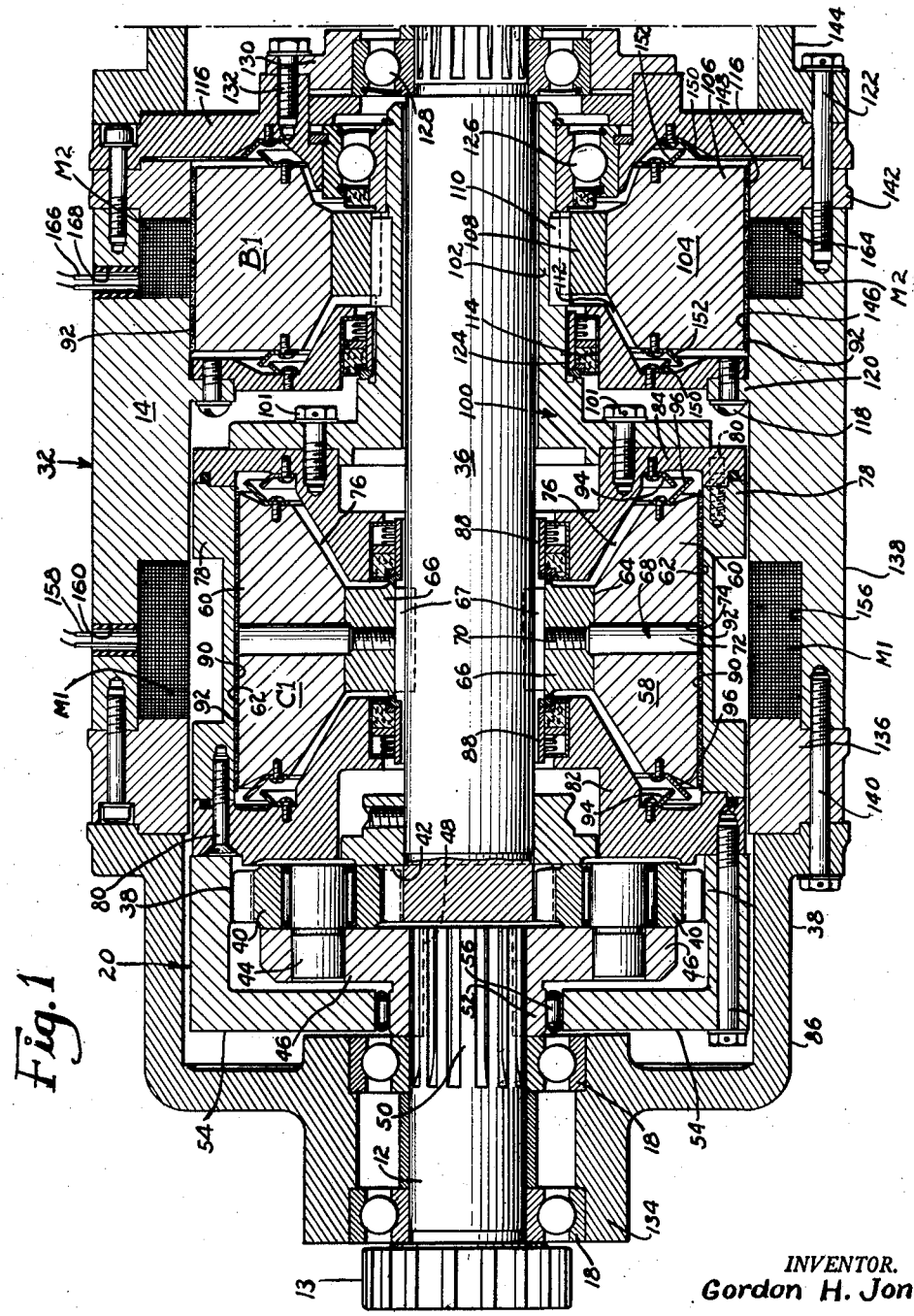
Figure 6:
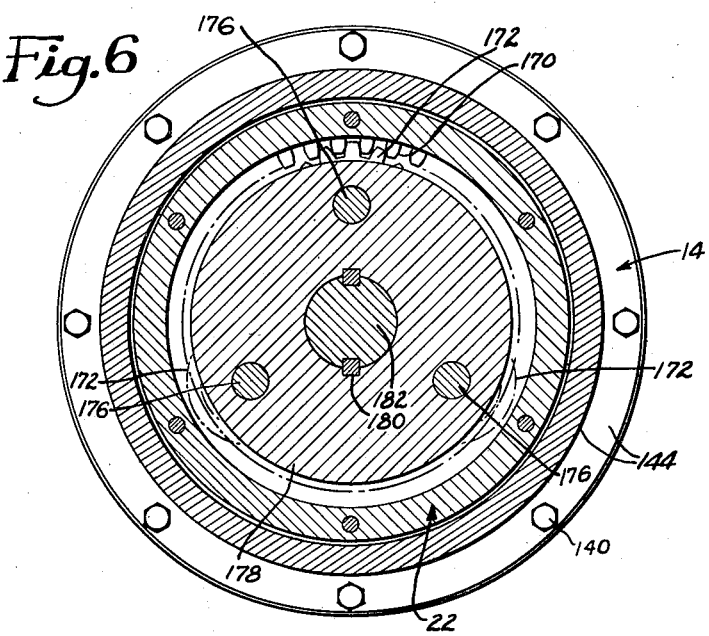
Fig. 6 is a sectional view taken substantially along the line 6—6 of Fig. 2.
Figure 7:
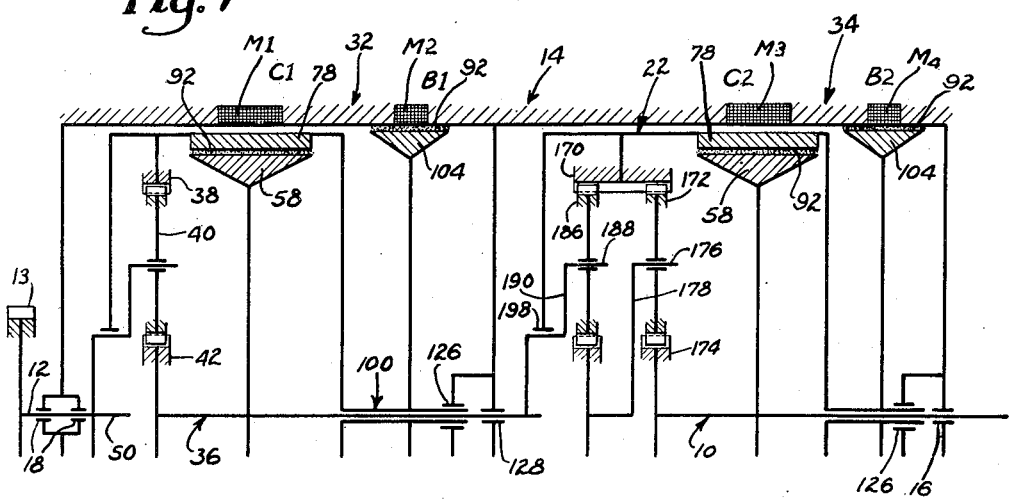
Fig. 7 is a schematic view of the transmission shown in Figs. 1 and 2.

Referring now to the drawings in detail, and particularly to Figs. 1, 2 and 7, the present transmission involves in its general organization an input or driving shaft 10 having suitable operative connection with a reversible motor (not shown) and an output or driven shaft 12 disposed in axial alinement with the driving shaft 10. The driven shaft 12 may have mounted thereon an output gear 13 by means of which power may be transmitted to a work performing instrumentality, as for example, one or more of the main operating units of a machine tool such as a horizontal boring, drilling and milling machine.

The shafts 10 and 12 are rotatably mounted within a stationary, generally cylindrical sectional housing or casing 14 having openings in its end walls to receive ball bearing assemblies 16 and 18 for respectively journaling the adjacent portions of the shafts 10 and 12.

The speed change mechanism of the transmission provides four speed changes including a direct drive between the driving shaft 10 and the driven shaft 12 and comprises two planetary gear sets designated generally at 20 and 22 together with a plurality of controls for the sets including a clutch assembly C1 and a brake assembly B1 for the planetary gear set 20 and a clutch assembly C2 and a brake assembly B2 for the planetary gear set 22. The clutch assemblies C1 and C2 and the brake assemblies B1 and B2 are capable of cooperating with the planetary gear sets 20 and 22 to establish first, second, third and fourth forward speed gear ratio drives through the transmission assembly from the driving shaft 10 to the driven shaft 12 as will be described hereinafter. No provision is made for establishing a reverse speed gear ratio drive through the transmission inasmuch as the transmission is capable of two-way operation when the driving shaft 10 is connected to a reversible motor or other source of power.

The planetary gear set 20 together with its control clutch C1 and control brake B1 constitute a transmission sub-assembly which has been designated in its entirety at 32 (Fig. 1), while the planetary gear set 22 and its control clutch assembly C2 and brake assembly B2 constitute a second transmission sub-assembly which has been designated in its entirety at 34 (Fig. 2), the two sub-assemblies 32 and 34 being arranged in tandem with the sectional casing or housing 14 thereof being common to both sub-assemblies.

The driving shaft 10 projects into the transmission sub-assembly 34 and the planetary gearing 22 serves to establish two gear ratio drives between the driving shaft 10 and an intermediate shaft 36 associated with the transmission sub-assembly 32, while the planetary gear set 20 serves to establish two gear ratio drives between the intermediate shaft 36 and the driven shaft 12. By thus selectively varying the operation or functioning of the two planetary gear sets 20 and 22, four speed change gear ratios may be selectively established between the driving shaft 10 and the driven shaft 12.

The particular gear ratio drives which the two planetary gear sets 20 and 22 are capable of establishing may be varied without departing from the spirit of the invention. For illustrative purposes, the gear set 20 may selectively establish a one to four gear ratio reduction drive between the intermediate shaft 36 and the driven shaft 12, or it may establish a direct drive between these shafts. The planetary gear set 22 is selectively capable of providing a one to sixteen gear ratio reduction drive between the driving shaft 10 and the intermediate shaft 36 or it may establish a direct drive between these two shafts. The two gear sets 20 and 22, when employed in series, are capable of selectively effecting a one to sixty-four gear ratio reduction drive, a one to sixteen gear ratio reduction drive, a one to four gear ratio reduction drive or a direct drive between the driving shaft 10 and the driven shaft 12.

The planetary gear set 20 is comprised of a ring gear 38 and a plurality of planet gears 40 meshing with the ring gear 38 and with a sun gear 42, the latter being suitably mounted or formed on an end of the intermediate shaft 36 and accordingly rotatable with the shaft. The planet gears 40 are rotatably mounted upon studs 44 which are secured in a planet carrier 46, the planet carrier being splined as at 48 to a reduced end 50 provided on the driven shaft 12 and thus the planet carrier 46 is operatively connected to the driven shaft in driving relationship.

The planet carrier 46 is provided with a sleeve portion 52 and the ring gear 38 is provided with a radially and inwardly extending flange portion or hub 54 and a roller bearing 56 is disposed between the inner edge of the hub 54 and the sleeve portion 52 of the planet carrier 46. By this arrangement, the planet carrier 46 forms a bearing support for the ring gear 38, thus providing a planetary gear set in which the rotating parts thereof are held in their rotating or orbital paths of movements within very close tolerances in order that the air gap associated with the clutch assembly C1 may be made small for a purpose which will be made clear presently. Additionally, because of the fact that the sun gear 42 is fixed on the end of the intermediate shaft 36 and is floatingly supported between the spaced planet gears 40, rotation of the latter serves to equally distribute the force or load to the various planet pinions.

The clutch assembly C1 and the brake assembly B1 are preferably of the magnetic particle type wherein a mixture of iron and graphite particles in the form of a fine powder is disposed between the relatively movable parts to be coupled. A control magnet positioned in the vicinity of the gap existing between the relatively movable parts serves, when energized, to establish a flow of magnetic flux across the gap, thus magnetizing the iron particles of the mixture and physically altering the characteristc of the mixture so that the same causes the relatively moving parts to bind. In the case of a magnetic particle clutch, the movable clutch parts are caused to rotate in unison while in the case of a magnetic particle brake, the movable part is caused to bind against the stationary part and thus terminate its motion. When the control magnet is deenergized, the relatively movable parts of either the clutch or of the brake are released and the graphite material of the mixture serves as an effective lubricant to prevent abrasion of either of the relatively movable parts.

The clutch assembly C1 includes a ring-like clutch member 58 which surrounds the intermediate shaft 36 and which is comprised of a ring element 60 having a cylindrical outer surface 62 and a cylindrical inner surface 64 of reduced width and to which surface there is secured in face-to-face relationship a ring 66 which is keyed as at 67 to the intermediate shaft 36. A pair of diammetrically disposed anchoring pins 68 serve to secure the ring 66 to the ring element 60. Each anchoring pin 68 includes a threaded portion 70 which is threadedly received in the ring 66 and a shank portion 72 which is tightly received by a pressed fit within a bore 74 provided in the ring element 60. The outer ends of the pins 68 may be ground flush with the cylindrical surface 62 of the ring element 60.

The clutch member 58 is enclosed within a chamber 76 provided in an annular casing which includes an annular outer wall 78 which may be formed of steel or other magnetizable material and which is secured at its opposite edges by means of screws 80 to side members of webs 82 and 84 of non-magnetizable material. The web 82 is secured by means of anchoring bolts 86 to the ring gear 38. The side members or webs 82 and 84 converge adjacent their inner ends and a pair of sealing glands 88 are disposed between the inner ends of the webs and the intermediate shaft 36 as well as between the webs and the ring 66 of the clutch member 58.

The annular wall 78 of the clutch assembly C1 is provided with a cylindrical inner surface 90 which is in close proximity to the outer cylindrical surface 62 of the clutch element 60 and a quantity of magnetic particle material 92, which may consist of a mixture of iron and graphite particles, is disposed between the gap which exists between the surfaces 90 and 62 and is maintained within this general region of the magnetic particle clutch by means of baffle members 94 secured to the inner sides of the webs 82 and 84 and baffle members 96 secured to the opposite sides of the element 60 of the clutch member 58. The baffle members 94 and 96 overlap each other as shown in Fig. 1 and serve to retain the magnetic particle material 92 within the space provided for it against dislodgment.

A hub extension 100 is secured by means of bolts 101 to the web member 84 and is provided with a sleeve portion 102 which surrounds the intermediate shaft 36.

The brake assembly B1 includes a brake member 104 comprising a ring-like brake element 106 formed of steel or other magnetizable material and an inner ring 108 of non-magnetizable material such as aluminum which is disposed within the element 106 and which is suitably secured thereto. The element 108 is keyed as at 110 to the sleeve portion 102 of the hub extension 100. The brake member 104 is enclosed within a chamber 112 existing by virtue of a pair of web members 114 and 116, respectively, of non-magnetizable material which are carried by the stationary casing 14. The web member 114 is secured by means of bolts 118 to an inner flange 120 provided on the casing 14 while the web 116 is clamped between a pair of adjacent casing sections by means of a clamping bolt 122.

The inner regions of the webs 114 and 116 converge toward each other and a sealing gland 124 is disposed between the inner end of the web 114 and sleeve 102. A sealed ball bearing unit 126 is disposed between the inner surface of the web 116 and the sleeve portion 102.

The forward end of the intermediate shaft 36 is piloted in an antifriction bearing 128 which in turn is clamped in position by means of a ring 130 secured by means of clamping bolts 132 to the web 116.

The casing of the sub-assembly 32 is of sectional design and at the left hand end thereof, as viewed in Fig. 1, it includes a bearing sleeve 134 of non-magnetizable material within which the bearings 18 are mounted. A ring member 136 of magnetizable material is disposed between the sleeve 134 and a medial cylindrical casing section 138 likewise formed of magnetizable material. A series of clamping bolts 140 to secure the members 134, 136 and 138 in position. The casing of the sub-assembly 32 also includes the previously mentioned web 116 which projects inwardly from the medial regions of the casing 14 and which is clamped between a ring-like section 142 of steel or other magnetizable material, and a central cylindrical section 144 of non-magnetizable material which serves to join the sectional casings of the two sub-assemblies 32 and 34 together. The clamping bolts 122 project through the section 144, web 116, and ring 142, and are threadedly received within the casing section 138.

The inner cylindrical surface 146 of the section 138 of the casing 14 is opposed to the outer cylindrical surface 148 of the brake element 104 and the space existing between these two surfaces is filled with a quantity of magnetic particle material 92, while a plurality of baffles 150, 152, similar to the baffles 94, 96 and provided on the web members 114, 116 and on the brake element 106, are provided for the purpose of preventing passage of the magnetic particle material 92 from space provided for it and existing between the surfaces 146 and 148.

An annular magnet coil M1 is associated with the clutch C1 and is disposed within a recess 156 provided between the casing sections 136 and 138. A pair of lead-in wires 158 extend to the magnet coil M1 through an opening 160 provided in the casing section 138. A similar magnet coil M2 is disposed within a recess 164 provided between the sections 138 and 142 of the stationary casing 14. Lead-in wires 166 extend through an opening 168 in the sleeve member 138 for the purpose of supplying energizing current to the coil M2. The inner surface regions of the coils M1 and M2 lie substantially flush with the inner cylindrical surface of the adjacent sectional parts of the casing 14.

The clutch C1 and the brake B1 are selectively operable, each to the exclusion of the other, to effect a direct drive or a one to four gear reduction drive through the transmission sub-assembly 32.

More particularly, the magnetic particle clutch C1 is adapted upon energization of the coil M1 thereof to cause engagement between the clutch member 58 and the annular wall 78 of the chamber 76 to thus connect the ring gear 38 to the intermediate shaft 36 and cause these two latter elements to rotate in unison. The entire planetary gear system 20 may be thus "locked up" to establish a direct drive from the intermediate shaft 36 to the driven shaft 12.

The magnetic particle brake B1 is adapted upon energization of the coil M2 thereof to cause engagement between the brake member 104 and the stationary casing 14, thus arresting rotation of the member 104 and consequently of the sleeve portion 102 of the hub extension 100, web 84, annular wall 78, web 82 and ring gear 38.

The intermediate shaft 36 is thus caused to drive the planet gears 40 so that the latter will roll around, so to speak, on the inner surface of the stationary ring gear 38 and thus rotate the planet carrier 46 which, in turn, will effect rotation of the driven shaft 12. The driven shaft 12 is thus driven from the intermediate shaft 36 at a reduced speed gear ratio.

The speed reduction between the shafts 36 and 12 is determined by the diameter or the relative number of teeth on the gears 42, 40 and 38, and, in the present instance, these gears are designed according to engineering exigencies so that a one to four gear reduction between the intermediate shaft 36 and the driven shaft 12 will be attained when the clutch C1 is deenergized and when the brake B2 is energized.

The transmission sub-assembly 34 is somewhat similar in its design to the transmission sub-assembly 32 but differs therefrom in that the planetary gear set 22 is of the compound type and is capable of selectively effecting a direct drive between the driving shaft 10 and the intermediate shaft 36 or a one to sixteen gear ratio reduction between these two shafts.

The planetary gear set 22 includes a ring gear 170 and a first set of planetary gears 172 which mesh with the ring gear 170 and also with a sun gear 174 mounted or formed on an end of the driving shaft 10. The planet gears 172 are rotatably mounted upon studs 176 which are secured in a first planet carrier 178 which is splined as at 180 to a relatively short shaft 182 having formed thereon a second sun gear 184 which meshes with a second set of planet gears 186 mounted on studs 188 secured in a second planet carrier 190. The planet carrier 190 is provided with a sleeve portion 191 which is splined as at 192 to a reduced end 194 on the intermediate shaft 36. The planet gears 186 also mesh with the ring gear 170.

The ring gear 170 is provided with a radially and inwardly extending flange portion or hub 196, and a roller bearing 198 is disposed between the inner edge of the tub 196 and the sleeve portion 191 of the planet carrier 190. By such an arrangement, the planet carrier 190 forms a bearing support for the ring gear 170. The support for the ring gear 170 on the sleeve portion 191 of the planet carrier 190 is such that the rotating parts of the planetary gear set 22 are held in their rotating or orbital paths of movement within very close tolerances in order that the air gap associated with the clutch assembly C2 may be made relatively small to insure maximum flux flow when the clutch is energized all in a manner that will be made clear presently. Because of the fact that the sun gears 174 and 184 are floatingly supported between the respective planet gears 172 and 186 with which they are in mesh, equal distribution of force or load to the various planet pinions is effected when the gear set 22 is in operation.

The clutch assembly C2 and the brake assembly B2 are substantially identical to the clutch and brake assemblies C1 and B1 previously described in connection with the transmission sub-assembly 32, and it is thought therefore that a detailed description of these latter assemblies is unnecessary. It has been deemed sufficient for descriptive purposes to apply characters of reference to the parts of the clutch and brake assemblies C2 and B2 of the transmission sub-assembly 34 which correspond to the clutch and brake assemblies C1 and B1 of the transmission sub-assembly 32. Thus, the clutch member 58, its keyed mounting on the driving shaft 10, and the various magnetizable parts 60, 78 and 136 of the clutch assembly C2 and the non-magnetizable parts 66, 82 and 84 thereof remain substantially the same as the corresponding parts of the clutch assembly C1. Similarly, the brake assembly B2 remains substantially the same as the brake assembly B1 and includes such corresponding parts as the sleeve portion 102 surrounding the shaft 10 and which is secured by means of bolts 101 to the web 80 of the clutch assembly C2, the magnetizable member 104, the casing section 138 and the ring-like section 142. Similarly, the non-magnetizable parts such as the webs 114 and 116 and the ring element 108 have not been altered. The clutch coil M3 and the brake coil M4 are disposed within the casing 14 in a manner substantially identical with the mounting on the clutch and brake coils M1 and M2 associated with the transmission sub-assembly 32.

The web 116 of the sub-assembly 34 constitutes an end plate for the entire transmission. The hub 130 which corresponds to the similarly designated hub of the transmission sub-assembly 32 is disposed at the extreme right hand end of the transmission as shown in Fig. 1 and serves to support therein the antifriction bearings 16 for the driving shaft 10.

The clutch C2 and the brake B2 are selectively operable each to the exclusion of the other to effect a direct drive or a one to sixteen gear reduction drive through the transmission sub-assembly 34.

The magnetic particle clutch C2 is adapted upon energization of its coil M3 to cause engagement between the clutch member 58 and the annular wall 78 of the chamber 76 to thus connect the ring gear 170 to the driving shaft 10. These two later elements are thus caused to rotate in unison to lock up the entire planetary gear system 22 and cause the intermediate shaft 36 to rotate in unison with the input shaft 10, thus establishing a direct drive between these two parts.

The magnetic particle brake B2 is adapted, upon energization of its coil M4 to cause engagement between the brake member 104 and the stationary casing 14, thus arresting rotation of the member 104 and consequently of the sleeve portion 102 of the hub extension 100, web 84, annular wall 78, web 82 and ring gear 170. With the ring gear 170 held stationary, the driving shaft 10 will tractionally rotate or drive the planet gears 172 so that they will roll about the inner surface of the stationary ring gear 170, thus driving the planet carrier 178 at a reduced rate of speed. The planet carrier 178, being keyed as at 180 to the shaft 182, causes rotation of the latter and the sun gear 184 on the shaft 182 serves to rotate the planet gears 186 so that they will roll on the inner surface of the stationary ring gear 170 and thus cause the planet carrier 190 to drive the intermediate shaft 36 at a still further reduced rate of speed.

The speed reduction between the driving shaft 10 and the intermediate shaft 36 is determined by the diameter or the relative number of teeth of the various gears which cooperate to make up the planetary gear set 22. In the present instance, the gears are designed so that a one to sixteen gear reduction between the shaft 10 and the intermediate shaft 36 will be obtained when the clutch 28 is deenergized and the brake 30 is energized. Since the transmission sub-assembly 32 is arranged in mechanical series with the transmission sub-assembly 34, and since the former assembly is capable of establishing a one to four gear reduction between the intermediate shaft 36 and the driven shaft 12 while the latter assembly is capable of establishing a one to sixteen gear reduction between the driving shaft 10 and the intermediate shaft 36, it is obvious that the series arrangement of sub-assemblies is capable of establishing a one to sixty-four gear reduction between the driving shaft 10 and the driven shaft 12. Furthermore, by establishing a direct drive through one of the sub-assemblies 32 or 34, as the case may be, while maintaining the other sub-assembly in its gear reduction drive, a one to four or a one to sixteen gear reduction may be established between the driving shaft 10 and the driven shaft 12. Where a direct drive is established between both transmission sub-assemblies 32 and 34, a direct drive from the driving shaft 10 to the driven shaft 12 will be attained.

The control operation of the transmission involving energization or deenergization of the clutches C1, C2 and of the brakes B1 and B2, will readily be understood by reference to the following table which sets forth the clutch and brake operation as well as the gear reduction attained through the transmission assembly when the brakes and clutches are selectively energized.

| Speed | C1 | C2 | B1 | B2 | Ratio |
|---|---|---|---|---|---|
| First | x | x | | | 1:1 |
| Second | | x | x | | 1:4 |
| Third | x | | | x | 1:16 |
| Fourth | | | x | x | 1:64 |

From the above table it will be seen that with the clutch C1 and the clutch C2 energized, both planetary gear sets 20 and 22 will be locked up and rotate as units, thus establishing a direct drive through the transmission from the input shaft 10 to the output shaft 12. With the clutch C2 and the brake B1 energized, a one to four gear ratio will be established through the sub-assembly 32 while a direct drive will exist through the sub-assembly 34. Thus, a one to four gear reduction will obtain through the transmission. With the clutch C1 and the brake B2 energized, a direct drive will exist through the sub-assembly 32 while a one to sixteen gear reduction will obtain through the sub-assembly 34. A one to sixteen gear reduction will therefore obtain through the entire transmission assembly. With the brake B1 and the brake B2 energized, a one to four gear reduction will obtain through the sub-assembly 32 while a one to sixteen gear reduction will obtain through the sub-assembly 34. These two gear reductions, when compounded, will result in a one to sixty-four gear reduction through the entire transmission.

Referring to Figs. 1 and 2, certain parts of the transmission assembly such as the hub 134, webs 82, 84, 114 and 116, ring elements 66 and 108 and the casing section 144 are comprised of a non-magnetic material which may be aluminum, brass, or the like. These parts have been cross-sectioned to readily distinguish them from other parts which are magnetic. The use of non-magnetic parts has been resorted to in order to enhance the flow of magnetic flux through the particle-filled gaps existing between the relatively moving parts of the various clutch and brake assemblies as well as to isolate the flow of magnetic flux through the various input or output shafts of the transmission sub-assemblies. For example, by making the webs 82 and 84 of the clutch C1 of non-magnetizable material, the flow of magnetic flux is confined to the ring member 60 and to the outer annular wall 78 of the clutch casing so that a relatively large flux flow passes across the particle-filled gap containing the magnetic material 92. By providing the ring 66 of non-magnetic material, magnetization of the intermediate shaft 36 is prevented. The same principle of flux isolation holds true in connection with the non-magnetic webs 114, 116.

Selective control of the transmission to establish different gear ratio drives through the transmission by selective operation of the clutches C1 and C2 and of the brakes B1 and B2 has been illustrated in the table of brake and clutch operation given above. The various clutch and brake mechanisms may also be selectively employed to cause the transmission as a whole to function either as a clutch or as a brake, or simultaneously as a combined clutch and brake. By energizing the clutch C2 and the brake B2 (Figs. 2 and 7), a braking torque will be applied to the driving shaft 10. By energizing the clutch C1 and brake B1 (Figs. 1 and 7), a braking torque will be applied to the driven shaft 12. In such a manner the transmission may be found useful for fast stopping purposes such as is required in the automatic positioning of a worktable. In such an instance it is contemplated that the transmission unit 34 may be employed in its entirety as a clutch to disengage the drive motor and that the transmission unit 32 may be employed in its entirety as a brake to bring the table rapidly to a standstill.

It should also be noted from the above description that the torque ratings of the respective clutch assemblies C1 and C2 may be relatively low as compared to the output torque of the transmission as a whole. In the case of the clutch C1, its torque rating need be only three-fourths of the output torque of the transmisison, while the torque rating of the clutch C2 need be only fifteen-sixteenths of the output torque.

I claim as my invention:

1. In a transmission, a driving shaft, an intermediate shaft and a driven shaft arranged in axial alinement, a first planetary gear set comprising a sun gear, planet gears, a ring gear and a carrier for said planet gears, said sun gear and carrier being connected to said intermediate and driven shafts respectively, a second planetary gear set comprising first and second sun gears, first and second planet gears meshing with said first and second sun gears respectively, a ring gear meshing with and common to said first and second planet gears, and first and second carriers for said first and second planet gears respectively, said first sun gear being connected to said driving shaft, said second sun gear being connected to the first planet carrier, said second planet carrier being connected to said intermediate shaft, releasable means for holding the ring gear of the first set against rotation, releasable means for holding the ring gear of the second set against rotation, releasable means for connecting the sun and ring gears of the first set, and releasable means for connecting the first sun gear and the ring gear of the second set.

2. In a transmission, a driving shaft, an intermediate shaft and a driven shaft arranged in axial alinement, first, second and third planetary gear sets for transmitting the drive from the driving shaft to the driven shaft through said intermediate shaft, each set comprising sun, planet and ring gears and a carrier for said planet gears, the sun gears of the first, second and third sets being connected to the intermediate shaft, the driving shaft, and the carrier of the second set respectively, the carrier of the first set being connected to the driven shaft, the carrier of the third set being connected to the intermediate shaft, the ring gears of the second and third sets being connected together, releasable means for holding the ring gear of the first set against rotation, releasable means for holding the ring gear of the second and third sets against rotation, releasable means for connecting the ring and sun gears of the first set, and releasable means for connecting the ring and sun gears of the second set.

3. In a transmission, a driving shaft, an intermediate shaft and a driven shaft arranged in axial alinement, first and second planetary gear sets for transmitting the drive from the driving shaft to the driven shaft through said intermediate shaft, each set comprising sun, planet and ring gears and a carrier for said planet gears, the sun gears of the first and second sets being connected to the intermediate and driving shafts respectively, the carrier of the first set being connected to the driven shaft, a third planetary gear set comprising sun, planet and ring elements and a carrier element for said planet element, means connecting one element of said third gear set to said intermediate shaft, means operatively connecting another element of said third gear set to the planet carrier of the second gear set, means operatively connecting another element of said gear set to said ring gear of the second planetary gear set, releasable means for holding the ring gear of the first set against rotation, releasable means for holding the ring gear of the second set against rotation, releasable means for connecting the ring and sun gears of the first set, and releasable means for connecting the ring and sun gears of the second set.

4. A transmission comprising in combination a cylindrical casing, axially alined driving, driven and intermediate shafts journaled in said casing, first, second and third planetary gear sets, each set comprising sun, planet and ring gears and a planet carrier, the sun gears of said sets being connected to said intermediate shaft, driving shaft and planet carrier of said second set respectively, the planet carriers of said first and third sets being connected to said driven shaft and intermediate shaft, respectively, first and second cylindrical magnetic clutches and first and second cylindrical magnetic brakes, each of said clutches and brakes having first and second coacting magnetic elements, a nonmagnetic connection between one element of each of said first clutch and brake and said ring gear of said first planetary gear set for unitary rotation, the second elements of said first clutch and brake having a nonmagnetic connection to said intermediate shaft and said casing, respectively, for selectively connecting said ring gear to said intermediate shaft and holding said ring gear against rotation, said ring gears of said second and third sets being connected together for unison rotation and having a nonmagnetic connection to one element of each of said second clutch and brake, the second elements of said clutch and brake having nonmagnetic connections to said driving shaft and casing, respectively, for selectively connecting said ring gears of said second and third sets to said driving shaft and holding said ring gears against rotation.

5. A transmission comprising in combination a casing having a cylindrical bore, axially alined driving and driven shafts in said casing bore and projecting from the ends thereof, an axially alined intermediate shaft in said casing, a gear assembly including axially alined first and second planetary gear sets in said casing bore, said first set including a sun gear connected to said intermediate shaft, a ring gear, and planet gears and a planet carrier connected to said driven shaft, said second gear set including a first sun gear connected to said driving shaft, a second sun gear, first and second planetary gears meshing with said respective first and second sun gears, a carrier for said first planetary gears connected to said second sun gear, a carrier for said second planetary gears connected to said intermediate shaft and a ring gear meshing with both sets of planetary gears, first and second magnetic assemblies, each including a magnetic clutch and brake, each clutch and brake having a pair of coacting members, one of said magnetic assemblies being interposed between said first and second gear sets, the other of said magnetic assemblies being positioned adjacent one end of said gear assembly, means of nonmagnetic material for connecting said ring gear of said first gear set to one of said coacting members of each of said clutch and said brake of said first magnetic assembly, means of nonmagnetic material for connecting said ring gear of said second gear set to one of said coacting members of each of said clutch and said brake of said second magnetic assembly, means of nonmagnetic material for connecting the other ones of said coacting members of each of said clutch and said brake of said first assembly to said intermediate shaft and casing respectively, and means of nonmagnetic material for connecting the other ones of said coacting members of each of said clutch and said brake of said second assembly to said driving shaft and casing respectively.

References Cited in the file of this patent

UNITED STATES PATENTS

| Number | Name | Date |
|---|---|---|
| 1,353,775 | Molyneaux | Sept. 21, 1920 |
| 1,379,833 | Newton | May 31, 1921 |
| 1,699,653 | Bronander | Jan. 22, 1929 |
| 2,052,815 | Wilsing | Sept. 1, 1936 |
| 2,389,177 | Ball | Nov. 20, 1945 |
| 2,391,333 | Nardone | Dec. 18, 1945 |
| 2,492,041 | Heise | Dec. 20, 1949 |
| 2,540,639 | Winther | Feb. 6, 1951 |
| 2,544,360 | Schmidt | Mar. 6, 1951 |
| 2,549,738 | Winther | Apr. 17, 1951 |
| 2,558,840 | Gordon | July 3, 1951 |
| 2,583,556 | Fleischel | Jan. 29, 1952 |
| 2,612,248 | Feiertag | Sept. 30, 1952 |

FOREIGN PATENTS

| Number | Country | Date |
|---|---|---|
| 288,243 | Italy | Sept. 1, 1931 |
| 416,331 | Great Britain | Sept. 11, 1943 |
| 488,062 | Germany | Dec. 19, 1929 |

OTHER REFERENCES

Vickers Magneclutch Bulletin No. 6000, 1950.